Patented Sept. 3, 1929.

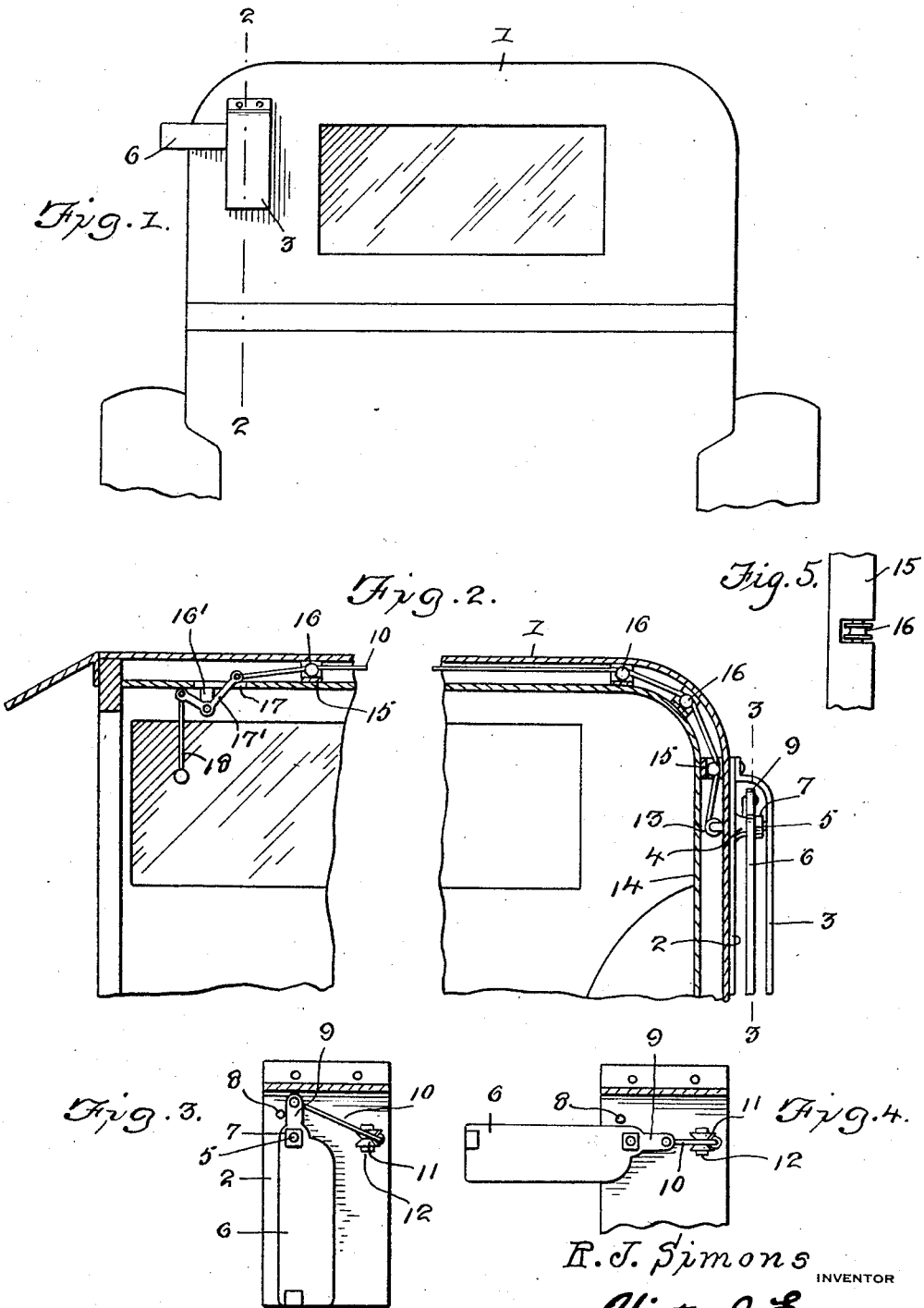
Sept. 3, 1929.  R. J. SIMONS  1,727,256
AUTOMOBILE SIGNAL
Filed July 11, 1928

1,727,256

UNITED STATES PATENT OFFICE.

RALPH J. SIMONS, OF PITTSBURGH, PENNSYLVANIA.

AUTOMOBILE SIGNAL.

Application filed July 11, 1928. Serial No. 291,843.

My present invention has reference to a direction signal or indicator for automobiles, and my object is the provision of a device for this purpose in which a signal arm is pivotally mounted in a housing of a simple but novel construction at the rear of the automobile body, and which has connected thereto and suitably guided along the top adjacent to the left hand side of the body, a pull element that is in turn connected to a bell crank lever having a depending handle that is in close proximity to the driver of the automobile and whereby a pull upon said element will cause the arm to swing through the housing to a horizontal position to indicate to traffic in the rear of the automobile the direction which the said automobile is to take and thereby avoid accidents which frequently result when the direction of travel of the automobile is not properly indicated.

A still further object is the provision of a direction signal for automobiles that is of an extremely simple construction, may be cheaply manufactured and easily positioned upon the automobile, and which signal is mounted on the back of the automobile so that the action thereof can be readily observed by pedestrians or traffic to the rear of the automobile and whereby the signal may be swung to signaling position by the operator of the automobile without necessitating him removing both of his hands from the steering wheel or without causing his attention to be directed away from the driving of the machine as frequently occurs when hand signaling is resorted to.

To the attainment of the foregoing the invention consists in the improvement as hereinafter described and definitely claimed.

In the drawings:

Figure 1 is a rear elevation of an automobile equipped with the improvement.

Figure 2 is a sectional view approximately on the line 2—2 of Figure 1, but showing the signal arm arranged in the housing.

Figure 3 is a sectional view approximately on the line 3—3 of Figure 2.

Figure 4 is a similar sectional view but showing the signal arm swung to signaling position.

Figure 5 is a detail sectional view showing the notches formed in the spacing strips to accommodate the guide pulleys.

On the rear, adjacent to the left hand side and likewise adjacent to the top of an automobile 1 I fix my improved signal. The housing for the signal contemplates an inner plate 2 which is fixed to the body of the automobile in any desired or preferred manner and an outer plate 3 which is spaced away from the inner plate 2. The plate 3 has its upper portion rounded toward the plate 2 and is secured to the said plate 2 only at its upper end. The plate 2 is formed with an outstanding boss 4 that is centrally formed with a pivot bolt 5, and on this pivot bolt the upper end of the signal arm or semaphore 6 is pivoted. The bolt is engaged by a suitable nut 7. By pivoting the arm 6, adjacent to one end thereof, the same will swing by gravity into the housing. The signal arm is held in vertical position in the housing through the medium of a stop pin 8 which contacts with the outer edge of a finger extension 9 on the upper end of the said arm. While not disclosed by the drawings it is obvious that the swinging of the arm 6 may actuate a switch to complete a normally open circuit and that this circuit may be wired to a lamp that is wired to the signal arm.

The outer end of the signal arm has secured thereto one end of a flexible element 10, and this element is trained around a grooved wheel 11 whose shaft is journaled in suitable bearings 12 on the inner plate 2 of the housing. The flexible element is directed through an opening in the said plate 2 and likewise through an opening in the back of the automobile body 1, and is from thence directed under a grooved wheel 13 that is suitably supported between the back and the inner panel or covering 14 for the back. The inner covering is directed along but spaced from the top of the automobile. Between the inner covering and the top and back there are spacing strips 15, each of which is notched and the said notches have arranged therein grooved wheels 16 whose trunnions are journaled in bearing openings in the side walls provided by the notches. The covering 14, adjacent to the front of the automobile has an opening 17 therethrough and to the sides of the opening is provided with depending plates or brackets 16' between which there is pivoted a bell crank lever 17'. One arm of the bell crank lever passes through the opening 17 and is connected to the second end of the flexible element 10, the second arm being arranged below the covering 14 and has attached thereto a pull element 18. The element 18 is arranged in close proximity to the driver of the automobile.

It will be obvious that a downward pull on the element 18 will swing the bell crank lever 17′ to draw on the flexible element 10 and to swing the signal arm to horizontal or signaling position. The stop pin 8 is contacted by one of the edges of the signal arm when in signaling position, so that the said element serves to hold the signal arm in both signaling and non-signaling position.

It is to be noted that the plate 3, at its connection with the plate 2 is rounded and this rounded surface provides a water shield. It will be further noted that the improvement is simple in construction and it is believed that the operation and advantages thereof will be fully understood and appreciated by those skilled in the art so that further detailed description is not thought necessary.

Having described the invention, I claim:

A direction signal for automobiles, comprising an elongated housing open at one side and adapted to be mounted on the automobile body, a pivot arranged within the housing, a signal arm swingingly mounted on said pivot and normally arranged wholly within the housing, an extension projecting from said arm, a flexible element secured to the extension, a guide pulley arranged within the housing and over which the flexible element is trained, said flexible element passing through an opening in the housing, spacing strips located at spaced points between the inner covering, top and back of the automobile, each strip having a notch formed therein, a guide pulley journaled in the notch of each strip, and over which the flexible element is adapted to be trained, whereby the flexible element is concealed from view, said covering having an opening therein, brackets depending from the sides of said opening, a bell crank lever pivotally mounted between said brackets and adjacent the top of the automobile and secured to one end of the flexible element, and an operating cord connected with the other end of the bell crank lever for the purpose specified.

In testimony whereof I affix my signature.

RALPH J. SIMONS.